(12) United States Patent
Campbell

(10) Patent No.: US 8,340,264 B1
(45) Date of Patent: *Dec. 25, 2012

(54) SYSTEM AND METHOD FOR PROVIDING SEGMENTED APPLICATIONS

(75) Inventor: James A. Campbell, Plano, TX (US)

(73) Assignee: Intervoice Limited Partnership, Dallas, TX (US)

( * ) Notice: Subject to any disclaimer, the term of this patent is extended or adjusted under 35 U.S.C. 154(b) by 1204 days.

This patent is subject to a terminal disclaimer.

(21) Appl. No.: 12/169,547

(22) Filed: Jul. 8, 2008

Related U.S. Application Data

(63) Continuation of application No. 09/982,592, filed on Oct. 18, 2001, now Pat. No. 7,397,909.

(60) Provisional application No. 60/242,333, filed on Oct. 19, 2000.

(51) Int. Cl.
*H04M 3/42* (2006.01)
*H04M 15/00* (2006.01)

(52) U.S. Cl. .......... 379/201.01; 379/114.05; 379/114.19

(58) Field of Classification Search ............. 379/201.01, 379/114.05, 114.19, 114.2, 211, 212, 202, 379/201.03, 114.01, 114.07
See application file for complete search history.

(56) References Cited

U.S. PATENT DOCUMENTS

| | | |
|---|---|---|
| 6,175,618 B1 | 1/2001 | Shah et al. |
| 6,470,080 B2 | 10/2002 | Perlmutter |
| 6,526,134 B1 | 2/2003 | Wallenius et al. |
| 6,801,613 B1 | 10/2004 | Hamilton |
| 6,940,961 B1 | 9/2005 | Grewing et al. |
| 7,076,032 B1 | 7/2006 | Pirasteh et al. |
| 7,599,861 B2 | 10/2009 | Peterson |

*Primary Examiner* — William Deane, Jr.
(74) *Attorney, Agent, or Firm* — Frost Brown Todd LLC

(57) ABSTRACT

The invention provides systems and methods in which an incoming call port is looped back at a switch and, under control of a call segment controller, is directed to applications and/or other termination points to provide enhanced calling services. According to a preferred embodiment, the call segment controller is provided with initial call instructions to initially direct an incoming call. The call may then be directed to an application which interacts with the call to determine further call instructions. These further call instructions are passed to the call segment controller to further process the call. Under control of the call segment controller the call may be directed to multiple termination points, including redirection to the application to provide subsequent interaction with the call.

13 Claims, 2 Drawing Sheets

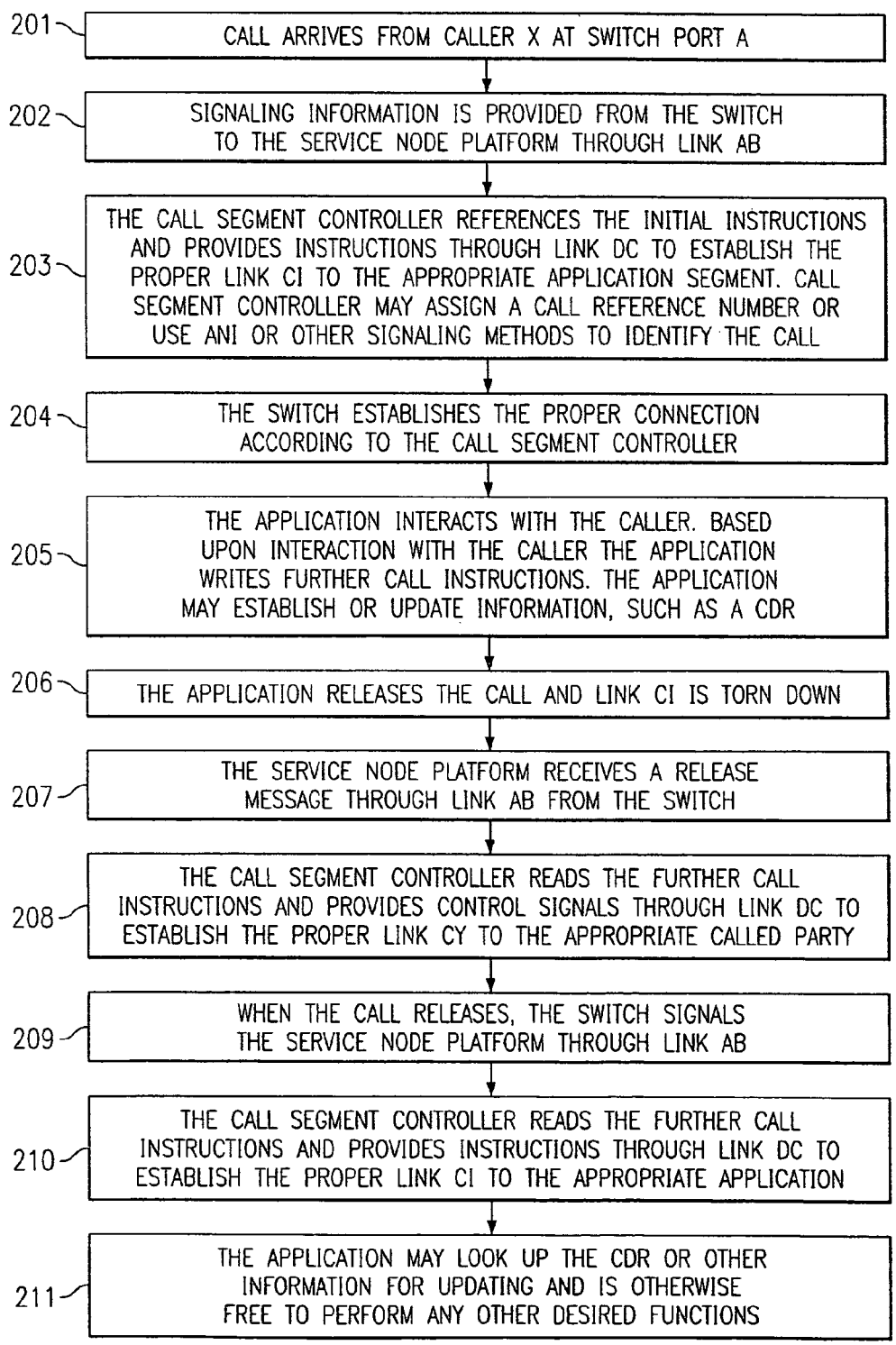

SYSTEM AND METHOD FOR PROVIDING SEGMENTED APPLICATIONS

CROSS-REFERENCE TO RELATED APPLICATIONS

This application is a Continuation claiming priority benefit of co-pending and commonly assigned U.S. patent application Ser. No. 09/982,592 filed Oct. 18, 2001, the disclosure of which is hereby incorporated herein by reference.

TECHNICAL FIELD

The present invention relates generally to providing of enhanced telephony services and, more particularly, to the providing of enhanced telephony services or applications without the benefit of advanced network signaling.

BACKGROUND OF THE INVENTION

In systems without intelligent network (IN) signaling, or similar robust and feature rich control signaling infrastructure, it is difficult to provide full featured enhanced calling services. For example, a call may be coupled to a first termination point, such as a prepaid system interactive voice response (IVR) unit, and subsequently a voice connection provided for the original caller to communicate with a called party at a second termination point. However, systems without robust control signaling capabilities providing such services typically require backhauling of circuits to the IVR, which requires the continued use of resources throughout the call, such as trunks etc., which are not necessary in providing the communication between the calling and called party.

Switches used in systems without interconnect network signaling generally do not provide a reoriginate calling function, or they have a proprietary solution (e.g., RLT), to allow the IVR to tear down its voice links to the switch, or backhaul links, and still allow the switch to establish full voice communication between the calling and called parties. Moreover, in particular scenarios, such as prepaid calling, debit calling, and even some postpaid calling, the tearing down of links to the IVR, even if available, may present implementation problems, such as the inability to accurately accumulate call records for call accounting, without adding substantial functionality to the switches or other network equipment.

A further concern in tearing down links to the IVR arises in providing robust services. For example, in a system that does not provide intelligent network signaling or similar functionality, it is typically accepted that when the calling party/called party link is released, further services cannot be provided, such as to provide an ending prepaid balance or to allow connection to a second called party.

Additionally, the IVR or other enhanced calling service application typically is fully intertwined with the control of the call segments. However, if the enhanced calling service application could be separated from the control of the call segments advantages could be realized in implementation of the systems. For example, enhanced calling services such as IVR could be developed independently of the actual network upon which they are to be deployed.

BRIEF SUMMARY OF THE INVENTION

The present invention is directed to a system and method which provides segmented application operation without the use of IN-like control infrastructure. The preferred embodiment of the present invention provides a call segment controller which initially controls calls. The call segment controller of the preferred embodiment has a set of initial instructions for call control. Preferably, the call segment controller is coupled to an application, such as an IVR application. In operation, such an embodiment, upon receipt of a call, may look to the initial instructions for a particular application to which to connect the call, establish the appropriate call segments accordingly, and utilize further call instructions as determined by the application to continue controlling the call.

The call segment controller of the present invention can preferably chain any number of different applications together. The applications do not have to be co-authored, contiguous, or even directly compatible. According to a preferred embodiment of the present invention there is no necessary interaction between the different applications. Instead, the call segment controller may utilize further instructions, as provided by one or more of these applications to continue to control the call and/or to end the call.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 2 shows a flow diagram of operation according to a preferred embodiment of the present invention.

DETAILED DESCRIPTION OF THE INVENTION

Figure 1A:
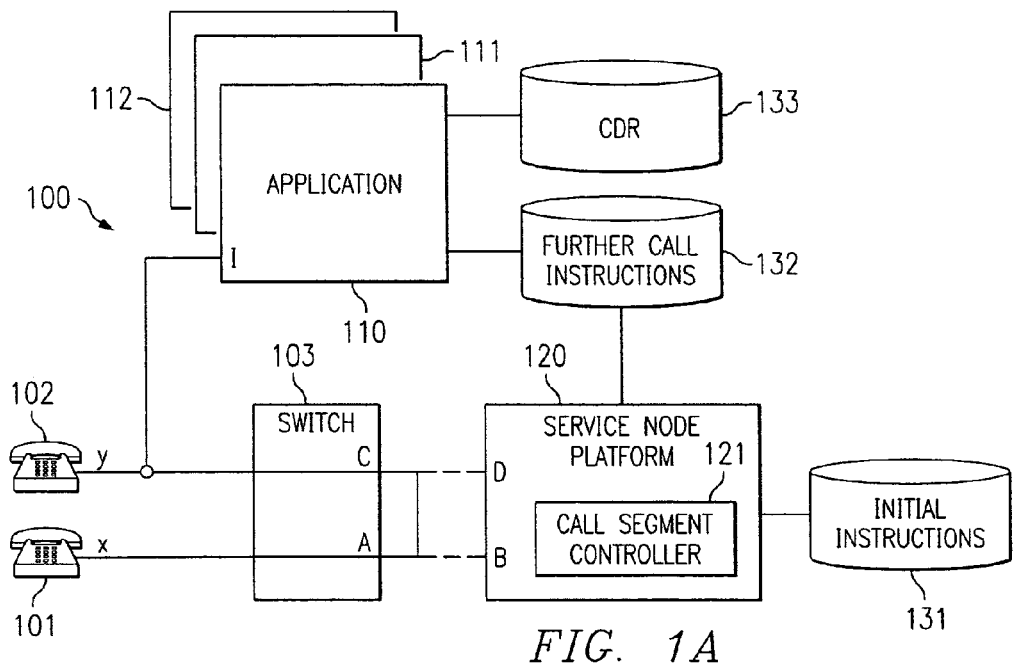
FIG. 1A shows a high level block diagram of a system adapted to implement enhanced calling services according to the present invention.

FIG. 1A shows a system adapted to implement enhanced calling services according to the present invention generally as system 100. It should be appreciated that system 100 is intended to be exemplary of an implementation of the features and concepts of the present invention and that other system configurations are within the scope of the present invention. For example, although showing a wireline based system, it should be appreciated that the present invention may be deployed in a wireless system, such as where at least one of phones 101 and 102 are a cellular or PCS phone and/or switch 103 is a mobile switching center. Additionally, the service node platform of the present invention may be coupled to any number of devices, such as a plurality of switches; more and/or different kinds of termination equipment (including but not limited to telephones, wireless or cellular telephones, computers, facsimile machines, and personal digital assistants), and various numbers of applications (including but not limited to applications distributed geographically, applications located locally, and applications located remotely), and, therefore, is not limited to the particular configuration shown. It should be appreciated that the call segment controller of the present invention may be implemented in a host other than the service node platform illustrated, if desired, provided sufficient processing power and interconnection of other elements of the present invention are suitably provided.

System 100 illustrated in FIG. 1A includes a typical PSTN based switch, switch 103, having some parties connected thereto, such as through phones 101 and 102. Coupled to switch 103 is a service node platform, service node platform 120, adapted according to the present invention. A preferred embodiment service node platform 120 includes SS7 signaling links, ISDN links, or other standards-based signaling methods provided to it from switch 103.

The preferred embodiment service node platform includes a call segment controller, call segment controller 121, of the present invention. Call segment controller 121 of the preferred embodiment is preferably adapted to receive a call on a particular number, look up an initial dial-to instruction or a particular number, and establish the desired initial link.

For example, where a call is initially received at switch 103 at port A, call information is provided to service node platform 120 through link AB. According to the preferred embodiment of the present invention, however, port A is looped back to port C, such that, although the switch directs the call to service node platform 120, no voice link is established there between. However, link AB provides call information, such as ANI, DNIS, and/or other call data, to service node platform 120. Because of the loop back arrangement of ports A and C, when call information is received at service node platform 120 via link AB, service node platform 120 will preferably provide dial out and other call control information on link DC in order to properly route the looped back call segment. The call may then be placed, using information provided via the DC link, to establish a proper link from port C to any other network port. For example, under control of the call segment controller the call may be routed to an application, a standard phone number, or any number of possible points.

If a call is routed to an application, such as one or more of applications 110-112, that application is preferably adapted to provide further call instructions to the call segment controller, such as through writing the appropriate further call instructions in a shared database (shown as call instructions database 132). According to the preferred embodiment, when the application releases the call the service node platform will access the further call instructions and continue to process the call. Accordingly, in operation according to this embodiment of the invention, the call segment controller may operate similar to a state machine to control calls based upon a connect and/or release state of call segments.

Applications utilized in providing enhanced calling services according to the present invention may provide any type of desired functionality. For example, an application may provide functionality such as an IVR dialogue to solicit information from a caller, a voice mail system, a call messaging system, a one number call routing system, a call forwarding system, a prepaid calling system, a call debit system, and the like. Accordingly, the applications may have associated therewith particular features or functions, such as called party information databases, calling party information databases, call tariff information, call data records (CDR), and the like.

According to the preferred embodiment of the present invention, the call segment controller continues to be provided with information with respect to the state of various segments of the call and is adapted to route the call back to an application, or an appropriate subsequent application, in order to provide for complete processing of the call. For example, in a prepaid calling system, after the called party releases the connection, the call segment controller may route the call to the prepaid IVR application to provide the calling party with information with respect to a remaining prepaid balance and/or to allow subsequent connection to another called party without reentry of a personal identification number (PIN).

Moreover, reconnection to an application, or connection to the appropriate subsequent application, allows the application to close or otherwise complete the call, such as to update call accounting records. Such an embodiment relieves the switch of having to, do the actual billing or similar tasks. Accordingly, the applications may be developed and implemented quicker and easier and without the switch vendor's interaction. Operation according to the preferred embodiment also allows utilization of applications of different vendors in a single call session and/or with a single call segment controller.

Figure 1B:
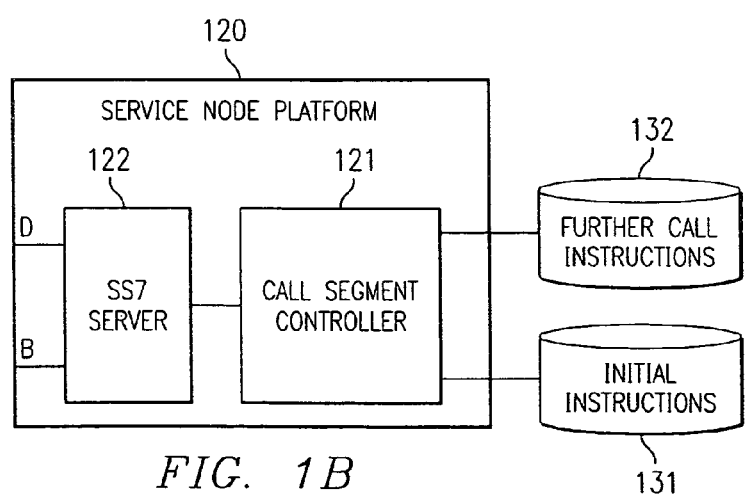
FIG. 1B shows a block diagram of a preferred embodiment of the service node platform of FIG. 1A.

Directing attention to FIG. 1B a preferred embodiment implementation of service node platform 120 is shown. In the preferred embodiment of FIG. 1B, service node platform 120 includes a communications server, such as SS7 server 122, with call segment controller 121 coupled thereto. Preferably SS7 server 122 is coupled to the network through V.35, T1, E1, ISDN, or like interface. Preferably, call segment controller 121 is coupled to the communications server using an application independent or a signaling independent link. Such a link is most preferably provided by a packet data interface, such as an Ethernet interface. Of course, call segment controller 121 may be coupled to the communications server through any number of means, including but not limited to a wide area network (WAN), a metropolitan area network (MAN), the Internet, a proprietary interface, or the like.

Although not shown, applications such as applications 110-112 may be coupled to a communication server, such as SS7 server 122, to thereby provide a gateway to the network. For example, application 110 may be coupled to SS7 server 122 through an Ethernet connection, or any other of the above identified links.

In operation, communications server 122 provides a protocol conversion from V.35, T1, E1, ISDN, etc. and then communicates the appropriate information in a protocol according to the link between the communications server and the call segment controller, such as the aforementioned Ethernet packet protocol. Preferably, the call segment controller has access to instructions, such as may be stored in database 131, that may be in the form of a list in a table, a configuration file, a relational database, or other data storage and retrieval scheme, and combinations thereof. According to a most preferred embodiment the call segment controller has access to dial-to numbers and dialed (e.g. DNIS) numbers in the aforementioned database. The call segment controller may then correlate dialed number information with a dial-to number to dial out to for particular applications.

It should be appreciated that the database information of the call segment controller of the present invention may be changed or updated dynamically or on the fly, such as to change a particular application that is offered when a particular number is dialed. For example, an application may be updated such that a new application, providing improved services, may be deployed at a particular network port and, to accommodate an instantaneous and uninterrupted hot changeover, the dial-to number for the dialed number associated with that service may be updated in the call segment controller database. Thereafter, the old application may be safely removed without fear of dropped calls or other interruptions in service.

According to preferred embodiments of the present invention the call segment controller and/or application systems utilized according to the present invention may be embodied on a processor based system operable under control of an instruction set defining operation as described herein. For example, a general purpose processor-based system, such as a personal computer system having a processor (such as a PENTIUM class processor available form INTEL), memory (such as RAM and/or hard disk storage), appropriate operator input/output devices (such as keyboard, pointing device, and/or display monitor) and appropriate electronic input/output interfaces (such as Ethernet interface, PSTN interface, etc.), may be used. If redundancy and high availability are a concern, any of these systems can be a fault tolerant system in which you have a desired level of redundancy, such as may be provided through use of a Sun SPARK FT or SPARK NETRA system configured appropriately.

A preferred embodiment communications server, such as communications server 122, is an InterVoice SS7 server available from InterVoice-Brite. This preferred embodiment SS7 server is based upon Sun Microsystems hardware (an ULTRA SPARK system) and includes V.35, T1 or E1 interface card for interfacing with a network such as the PSTN. The SS7 server also preferably includes an Ethernet interface card for interfacing with the call segment controller of the present invention. Accordingly, the SS7 server maintains the protocols and state machines of the particular protocol in order to provide signaling to the coupled devices, such as the call segment controller. Preferably, the message set behind the SS7 server is protocol independent, such as might include a combination of the ANSI and ITU specification capabilities in one particular message set. Accordingly, the call segment controller can be disposed behind the SS7 server and connect up much as an IVR or a VRU or a TRM.

It should be appreciated that where sufficient processing power is provided, the functionality of the communication server and that of the call segment controller and/or application may be provided in a single system.

In order to better understand operation according to the present invention, the steps of a prepaid calling service shall be described herein with reference to FIG. 2. However, it should be appreciated that the present invention is not limited to use in such services.

Directing attention to the steps of FIG. 2, and with reference to the system illustrated in FIG. 1A, at step 201 a call arrives at switch 103 at port A from the caller at telephone 101 (link XA). Switch 103 directs the call to service node platform 120, such as based on the dialed number information, but because of the loop back of port A to port C, no voice link is actually established to service node platform 120. However, a signaling link, link AB, is established between switch 103 and service node platform 120.

At step 202 signaling information is provided from switch 103 to service node platform through link AB. This signaling information may include ANI, DNIS, or any other call information available and/or desirable.

At step 203 call segment controller 121 of service node platform 120 references the initial call instructions stored in database 131 and provides signaling to control the call. For example, call segment controller 121 may look up the ANI or DNIS of the call to determine the initial dial instructions which are appropriate for the call. The call control signals are provided to switch 103 by call segment controller 121 through link DC.

Additionally, segment controller 121 may assign a call reference number to subsequently uniquely identify the call. The call reference number may be the call's ANI information, or some derivation thereof, or other signaling methods as supported (such as are available in SS7 signaling or ISDN) or may simply be unique bits assigned to the call. The call reference number can preferably be transferred to the application. Accordingly, the application then has a unique ID in which it can relate the different segments of the call, because the application will not be involved in the full length of the call. Although the application will only be involved in small segments of the actual application, the call segment controller preferably provides call control instructions throughout the call, such as through the signaling link of the application, and therefore may be utilized to enable the application or applications to relate the various call segments.

At step 204 switch 103 establishes the proper connection according to the control signals provided by call segment controller 121. For example, where the initial call instructions indicate that the call should be connected to application 110 providing prepaid calling services, switch 103 may establish link CI to place application 110 in communication with telephone 101.

Preferably, information is provided to the application by the call segment processor of the present invention. For example, the application is preferably provided with the call reference number of the call. This information may be transmitted in the signaling information provided from the call segment controller through the network. Additionally or alternatively, this information may be available on the network without the call segment controller transmitting it, such as where only ANI information is relied upon to identify a particular call. Alternatively, the call segment controller may directly communicate information to the appropriate application, such as through database 132.

At step 205 application 110 interacts with the caller. For example, where application 110 provides prepaid calling services, application 110 may solicit the caller's PIN and call-to number. Thereafter, application 110 may verify that the caller has a sufficient prepaid balance and determine a maximum amount of time allowed for a call to the called number. Application 110 may create or update a call data record (CDR), such as in database 133, in order to account for the call to the called party. In general, the application could do any interaction it needed to validate data, any lookups on the caller or associated account, PIN verification, any behaviors or any amount of interaction that are necessary. Such interaction may include voice recognition and/or speech to text.

Based upon the interaction with the calling party, or based upon other processing by application 110, application 110 provides further call instructions to call segment controller 121. For example, further call instructions may be written to database 132 which is accessible to both application 110 and call segment controller 121.

The further call instructions may have any number of possible fields. According to a preferred embodiment of the present invention, the further call instructions include the call reference number, a dial-to number, a dial-to when finished number, and a maximum call duration. The maximum call duration allows a prepaid calling system to prevent or limit negative account balances etc. For example, the call segment controller may utilize this information to cut a call off at a particular time, such as by issuing a release control signal to the switch. The dial-to when finished number preferably is utilized to provide services after the call has been released. For example, when the main call finishes the caller may be redirected to application 110 to allow application 110 to write out CDR activity records or any other necessary information.

At step 206 application 110 releases the call and link CI is torn down. At step 207 switch 103 signals service node platform 120 through link AB that link CI has been released. Accordingly, call segment controller 121 knows to look to database 132 for further call instructions. At step 208 call segment controller 121 reads the further call instructions and provides control signals through link DC to switch 103 in order to establish the proper link CY to the appropriate called party. Although the called party is illustrated as telephone 102, it should be appreciated that this subsequent link may be to any desired port. For example, application 110 may provide instructions for call segment controller 121 to connect the call to application 111, if desired.

At step 209 when the call releases switch 103 preferably signals service node platform 120 that link CY has been released. Accordingly, call segment controller 121 knows to again look to database 132 for further call instructions. At step 210 call segment controller 121 reads the further call instructions and provides control signals through link DC to switch 103 in order to establish the proper link CI to the appropriate application. At step 211 application 110 may perform desired functions, such as interacting with the calling party to establish subsequent calls, updating or closing out a CDR associated with the call, or any other activity.

When the call releases, the service node platform will preferably look to see if any further instructions have been left for it. If the calling party has released or hung up, the call segment controller is a virtual application and may or may not continue to process. For example, in the above described scenario where a prepaid calling service is being performed further processing may be desired in order to close out the CDR. However, in some situations, such as a call forwarding service, further processing may not be desired after the release of the call.

If the calling party releases the line, there may be no need to establish a voice link to application 110. However, the preferred embodiment of the present invention may nevertheless take subsequent steps in order to finish the call. For example, data with respect to the call reference number and the duration of the call may be provided to application 110 in order to allow the appropriate CDR to be updated. This information may be provided to application 110 by call segment controller by communication through database 132 or through a data connection such as Ethernet there between, for example. Such an embodiment might be desirable in order to avoid unnecessarily tying up switching ports.

Alternatively, the call segment controller may place another call through standard PSTN methods to the appropriate application so that the application can close out the call. For example, special dial-to instructions may be utilized, such as defining a particular port of the application, so that the application knows that this is a call closing action and may react accordingly, such as to hang up the line immediately after the call arrives and then close out the call and/or provide any interactions that may be need. Preferably, no voice path is actually associated with a call when the calling party has already dropped, other than for the purposes of getting information transferred over the SS7, ISDN or other signaling method.

It should be appreciated that the steps outlined above provide various interactions that can occur over and over and in various sequences in order to provide a desired enhanced calling service. The signaling methods utilized according to the present invention can be SS7, ISDN, or other available signaling method. For example, embodiments of the present invention may utilize standard in-band signaling, or may utilize ISDN. The most preferred embodiments utilize SS7 or ISDN because of the speed that is provided by these signaling methods. The interaction with the caller provided by the applications are preferably robust, such as full featured IVR applications.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of controlling a call in segments, said method comprising:
   receiving a call and associated call information at a call segment controller;
   responsive to said receiving said associated call information, selecting call control signaling associated with said associated call information from a plurality of initial call segment directing information in said call segment controller;
   directing said call to a first application using said selected call control signaling;
   receiving call segment information from said first application at said call segment controller;
   responsive to said receiving said call segment information, selecting additional call control signaling; and
   directing said call to a second application using said additional call control signaling.

2. The method of claim 1, further comprising:
   providing, by said call segment controller, information associated with said call to said first application.

3. The method of claim 2, further comprising:
   receiving, from said first application, information associated with said call at said call segment controller.

4. The method of claim 3, wherein said information associated with said call received from said first application at said call segment controller comprises call reference information.

5. The method of claim 1, further comprising:
   providing, by said call segment controller, further call control signaling to again direct said call to said first application.

6. The method of claim 1, further comprising:
altering said plurality of initial call segment directing information to result in initially directing said call to said first application rather than another application of a plurality of applications.

7. A system comprising:
a call segment controller configured to receive a call;
a plurality of call applications in communication with said call segment controller, wherein said call segment controller provides call information exchange between said plurality of call applications and said call segment controller, wherein said call segment controller interacts with call applications of said plurality of call applications through use of said call information exchange to control segments of said call; and
a communications server coupled to said call segment controller, wherein said call is coupled to said communications server, and wherein call information without voice information is provided to said call segment controller by said communications server.

8. The system of claim 7, wherein said call segment controller comprises an initial call directing instruction, wherein said initial call directing instruction operates with said call information provided to said call segment controller in determining call control information for providing directing of said call to a first application of said plurality of applications.

9. The system of claim 8, wherein said first application is an application of said plurality of applications for obtaining information associated with said call, wherein said information associated with said call obtained by said first application is communicated to said call segment controller.

10. The system of claim 9, wherein said first application has associated therewith a resource selected from the group consisting of:
a called party information database;
a calling party information database;
call tariff database; and
a call data record database.

11. The system of claim 9, wherein said first application comprises a voice response unit to solicit said information associated with said call from said caller.

12. The system of claim 11, wherein said information associated with said call comprises an enhanced calling service desired by said caller.

13. The system of claim 12, wherein said enhanced calling service comprises one of:
a prepaid calling service;
a post-paid calling service;
a voice mail system;
a call messaging system;
a one number call routing system; and
a call forwarding system.

* * * * *